Patented Nov. 19, 1929

1,736,072

UNITED STATES PATENT OFFICE

LIONEL H. DUSCHAK, OF SAN FRANCISCO, CALIFORNIA, ASSIGNOR, BY MESNE ASSIGN-
MENTS, TO OLIVER UNITED FILTERS INCORPORATED, OF SAN FRANCISCO, CALI-
FORNIA, A CORPORATION OF NEVADA

METHOD OF USING AMALGAMS

No Drawing.   Application filed June 22, 1925.   Serial No. 38,939.

This invention relates to a method for increasing the efficiency in the use of amalgams in chemical and metallurgical processes, and its object is to reduce the loss of the alkali metals used to promote the action of such amalgams.

In the use of amalgams as chemical reducing agents in various chemical and metallurgical operations a portion of the metal dissolved in or combined with the mercury to form the reducing amalgam is frequently wasted through the occurrence of useless side reactions which take place simultaneously with the useful effect which it is desired to promote. As an example—the use of sodium amalgam or similar alkali amalgam for the precipitation of silver from an aqueous cyanide solution may be cited. The object in this case is to precipitate and separate the silver from the solution and at the same time to restore to the solution in active form the cyanide with which the silver was combined. The chemical reaction involved may be expressed as follows:

(1) 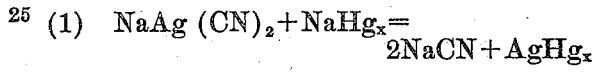
$$NaAg(CN)_2 + NaHg_x = 2NaCN + AgHg_x$$

In the above equation the symbol $NaHg_x$ is used to represent sodium amalgam, that is, sodium dissolved in the mercury, and similarly the symbol $AgHg_x$ is used to represent silver amalgam. However, only about 5% of the amalgam is actually used this way.

The above equation then represents the chemical interchange in which metallic sodium from the amalgam takes the place of the silver in the aqueous cyanide solution and the silver, simultaneously reduced to the metallic state, enters the mercury to form silver amalgam.

Sodium amalgam also has a tendency to react with the water of any aqueous solution to form hydrogen. This reaction may be formulated as follows:

(2) 
$$2H_2O + 2NaHg_x = H_2 + 2NaOH + 2xHg$$

That portion of the sodium taking part in this second reaction is obviously wasted, and often runs up to 95% of the total. Its reducing power has been used up in liberating hydrogen and it is no longer available for effecting the desired reaction, namely, the precipitation of the silver.

A similar argument may be made in the case of other amalgams and for uses of amalgams for purposes of reduction other than the one cited above. In any process in which such an amalgam is used as a reducing agent the metal dissolved in or combined with the mercury to form the amalgam is the active reducing agent and also the expensive substance used up in the process. Owing to the fact that metals such as sodium, which may be used for this purpose, are relatively expensive it is important to avoid their wastage as far as possible through the occurrence of any useless side reactions. In the case described above for example it is desirable to carry out the process in such a way that the greatest possible amount of the sodium will react according to the first equation and that a minimum amount of sodium will participate in the second reaction.

I have found that in processes depending on the reducing action of a liquid or semi-liquid amalgam upon another liquid the efficiency of the process may be greatly improved by carrying out the reaction between the amalgam and the other liquid in an apparatus in which no solid metal, or other relatively good solid conductor of electricity such as graphite is exposed. If the amalgam and the liquid with which it is to react are prevented from making simultaneous contact with any metallic or similar surface which can act as an electrode for the depolarization and release of hydrogen, the wastage of the active metal in the amalgam, through its reaction with the solution to form hydrogen, may be very largely prevented, the loss above noted being reduced to about 20%, a saving of about 75% in the active element of the amalgam.

Suitable conditions for utilizing amalgams effectively may be obtained by carrying out the reaction in an apparatus constructed of, or lined with, such substances as wood, rubber, glass or porcelain. No solid metal or substance such as graphite or carbon should be exposed within the apparatus in such a way that both the amalgam and the liquid to be treated may come in contact with it. The apparatus may for example take the form of a revolving wooden drum with lifters for distributing the amalgam through the liquid with which it is to react. The invention, however, is not limited to the use of any particular form of apparatus.

The process used as an illustration in the first place of the above description was one in which an amalgam was used for producing a certain reducing effect upon an aqueous solution. It is not intended to limit the scope of the invention to the application of amalgams for reaction with aqueous solution. The method for the efficient use of amalgam described above applies in like manner to any reaction between a liquid or semi-liquid amalgam and another liquid or semi-liquid in which the release of hydrogen through the reaction of the amalgam with the liquid would constitute a wastage of the metal dissolved in the mercury to form the amalgam. The use of an amalgam for the reduction of an organic liquid or a substance dissolved in an organic solvent where the release of hydrogen is not desired illustrates the type of reaction just referred to.

What I claim is as follows, but modifications may be made in the above particularly described form of the invention within the purview thereof.

A method of effecting chemical reactions with amalgams which comprises mixing an alkali metal amalgam with a solution of the substance to be treated out of contact with any solid electrical conducting substance.

In testimony whereof I have hereunto set my hand this 5th day of June A. D. 1925.

LIONEL H. DUSCHAK.